(12) United States Patent
Pizzato et al.

(10) Patent No.: US 12,313,221 B2
(45) Date of Patent: May 27, 2025

(54) HANDLE ACTUATOR DEVICE FOR ACCESS TO INDUSTRIAL MACHINES OR PLANTS AND RELATED ASSEMBLY

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 85 days.

(21) Appl. No.: 18/033,557

(22) PCT Filed: Oct. 25, 2021

(86) PCT No.: PCT/IB2021/059813
§ 371 (c)(1),
(2) Date: Apr. 25, 2023

(87) PCT Pub. No.: WO2022/090887
PCT Pub. Date: May 5, 2022

(65) Prior Publication Data
US 2023/0392748 A1  Dec. 7, 2023

(30) Foreign Application Priority Data
Oct. 26, 2020  (IT) .................. 102020000025354

(51) Int. Cl.
*F16P 3/08* (2006.01)
(52) U.S. Cl.
CPC .................... *F16P 3/08* (2013.01)

(58) Field of Classification Search
CPC . E05B 1/00; E05B 47/00; E05B 17/00; E05B 13/10; F16P 3/08; F16P 3/12; Y10T 70/5757
USPC .......................................... 70/207
See application file for complete search history.

(56) References Cited

U.S. PATENT DOCUMENTS

| 10,711,489 | B1 * | 7/2020 | Zhang | ............. E05B 63/04 |
| 12,046,096 | B2 * | 7/2024 | Pizzato | ............. G07C 9/29 |
| 2020/0378157 | A1 * | 12/2020 | Zhang | ............. E05B 63/0056 |
| 2024/0238978 | A1 * | 7/2024 | Pizzato | ............. G07C 9/00896 |

FOREIGN PATENT DOCUMENTS

| EP | 3744930 A1 * | 12/2020 | ............. E05B 17/10 |
| WO | WO-2024052666 A2 * | 3/2024 | ............. F16P 3/08 |

* cited by examiner

*Primary Examiner* — Suzanne L Barrett
(74) *Attorney, Agent, or Firm* — Rivka Friedman (57) ABSTRACT

A handle actuator device for barriers or protection panels comprises a shell (3) having means for anchoring to the access (A) and provided with a handle portion (4) adapted to be grasped by a user for moving the access (A), an actuator (5) associated with the shell (3) and provided with a first transmitting or receiving element (6) adapted to interact with the fixed receiving or transmitting device (2) placed on the fixed frame (T) of the access (A) at the closing thereof to enable/disable one or more operations of the machine or plant to be monitored, wherein the shell (3) comprises a housing (7) shaped to accommodate said actuator (5) according to at least two configurations wherein the first element (6) is oriented according to at least two different positions and is facing two different faces (8, 9) of the housing (7).

14 Claims, 7 Drawing Sheets

HANDLE ACTUATOR DEVICE FOR ACCESS TO INDUSTRIAL MACHINES OR PLANTS AND RELATED ASSEMBLY

TECHNICAL FIELD

The present invention finds application in the field of electrical devices for industrial use and has particularly as its object a handle actuator device designed for barriers or protection panels for guarding accesses to machines or industrial plants. The invention also relates to an actuator assembly provided with the above handle actuator device for access control.

STATE OF THE ART

As known, accesses to industrial machines or plants require constant surveillance through the provision of means that prevent the operators from voluntarily or accidentally entering the operating perimeter.

To this end, the accesses such as barriers, perimeters and protection panels are generally provided with one or more safety devices connected to the power supply circuit of the machine or plant, as well as possibly to auxiliary service circuits, in order to allow access within the perimeter only after the machine or plant or dangerous parts thereof have been blocked, constantly signalling both the operating status of the machine or plant and any anomalies that may affect any part of the plant.

The safety degree of these devices must be the higher the higher the risk that would be encountered in the event that an operator was to enter the perimeter with the machine or plant still operating.

A well-known type of access control devices are the safety handles, i.e. devices that allow the opening and closing of the access, allowing at the same time to carry out the shutdown of the system, or only of a part thereof, when opening the access or simply unlocking it.

An example of a safety handle is disclosed in US2005/108945, wherein the handle comprises magnetic sensor means that detect the opening of the access to control the consequent opening of the power supply circuit and the consequent shutdown of the system.

Another example of a safety handle for access control is disclosed in DE102009039591, wherein the handle is associated with actuator means designed to interact with an actuator device associated with the fixed part of the access. Furthermore, WO2019229717, in the name of the same Applicant, discloses a further type of handle wherein the main body is formed by an anchoring bracket adapted to be fixed to the frame of the movable part of the access and from a body or casing also having the function of a handle, fixed in turn to the bracket.

The bracket also has a seat for fixing the actuator provided with RFID (Radio Frequency Identification) tag adapted to interact with suitable control means, generally an antenna placed in a switch or sensor applied to the fixed part of the frame, to signal that the access has been closed and to enable the start-up of the guarded machine or plant.

The actuator element consists of a block which houses the RFID tag thereinside and is provided with a centering and holding element adapted to cooperate with a locking/unlocking mechanism present in the fixed device following its insertion in a suitable slot present in the latter, according to typical operating patterns for this kind of safety devices.

In turn, the bracket is designed to house the actuator according to two different orientations, depending on whether the access is of the hinge opening, of the right or left type, or sliding opening type.

The solution described above is particularly suitable to be applied in areas where a level of safety is required such that access is also blocked during the operating phases of the machine or plant or in any case in all conditions wherein the security conditions would not be guaranteed within the guarded perimeter.

Furthermore, this solution is particularly robust and therefore requires spaces and structures suitable for the fixing thereof, typical of accesses that require particular levels of safety.

At the same time, the need is felt for lighter solutions that are also suitable for accesses with smaller fixing spaces and wherein it is not necessary to block the access at the same time as it is closed.

In these cases, the common solutions that provide for the use of actuator systems associated with the handle, whether they are electromechanical or RFID tags/antenna or similar electronic systems, are generally limited in the orientation possibilities of the actuator means, making it necessary to design different models based on the final orientation of the handle.

Alternatively, these solutions must be equipped with multiple actuators suitable to selectively engage the receiving element placed on the fixed device, such as a switch or sensor, based on the position actually taken by the handle.

SCOPE OF THE INVENTION

The object of the present invention is to overcome the above drawbacks by realizing a handle actuator device adapted to be applied to barriers or protection panels for the supervision of industrial machines or plants which is characterized by particular efficiency and relative cost effectiveness.

A particular object is to provide a handle actuator device adapted to applied to barriers or protection panels that can be applied to the frame of the access according to different orientations depending on the available spaces and on the position of the switch device which it is designed to interact with upon the closure of the access.

Still another object is to provide a handle actuator device applicable to barriers or protection panels that does not require structural changes depending on the orientation chosen in the fixing thereof but for which it is sufficient to provide a few simple reconfiguration operations.

Still another object is to provide a handle actuator device applicable to barriers or protection panels which can operate according to different fixing orientations by means of a single actuator element.

Still another object is to provide a handle actuator device applicable to barriers or protection panels characterized by a simple and compact structure.

These objects, as well as others which will become more apparent hereinafter, are obtained by a handle actuator device adapted to be associated with an access of barriers or protection panels of industrial machines or plants, wherein an access comprises a movable part and a fixed frame to which a fixed receiving or transmitting device connected to the machine or plant is anchored, which actuator device, according to claim 1, comprises a shell having means for anchoring to the movable part of the access and provided with a handle portion adapted to be grasped by a user for the movement of the movable part of the access, at least one actuator associated with the shell and provided with a first transmitting or receiving element adapted to interact with the receiving or transmitting device placed on the fixed frame of the access upon closing it to enable/disable one or more machine or plant operations to be monitored.

According to a peculiar feature of the invention, the shell has at least one housing shaped to accommodate said at least one actuator according to at least two configurations in which said first element is oriented according to at least two different positions and is selectively facing at least two different faces of said housing.

In this way, the position of the first transmitting or receiving element, for example an RFID tag or an antenna, can be modified according to the orientation of the shell, once anchored to the movable part of the access, and/or to the orientation of the fixed device present on the access frame, so as to anchor the handle device even in smaller spaces without losing the ability to interact with the fixed device.

Advantageous embodiments of the invention are obtained in accordance with the dependent claims.

BRIEF DISCLOSURE OF THE DRAWINGS

Further features and advantages of the invention will become more apparent in the light of the detailed description of some preferred but not exclusive embodiments of the handle actuator device according to the invention and of an actuator assembly comprising it, shown by way of non-limiting example with the aid of the attached drawing tables wherein.

BEST MODES OF CARRYING OUT THE INVENTION

With reference to the attached figures, some preferred but not exclusive embodiments of a handle actuator device designed to be applied at an access of perimeters or safety barriers placed to protect machines or industrial plants are shown.

In particular, in a known manner, access can be suitably provided with appropriate electronic or electromechanical safety devices designed to interrupt the operation of the machine or plant, or of a part thereof, upon opening or even just of its unlocking, or to signal that unlocking or opening occurred in order to allow the intervention of an operator, according to known methods and therefore not described in more detail here below.

Generally speaking, the actuator device according to the present invention, indicated globally with 1, will be designed to be anchored to the movable part M of an access A to interact, upon closing the access itself, with a fixed device 2 anchored to the fixed frame T of the access A and which can be connected to one or more power and/or service circuits of the machine or plant so that the interaction between the movable actuator device 1 and the fixed receiving device 2 modifies one or more operations of the machine or plant.

Figure 1:
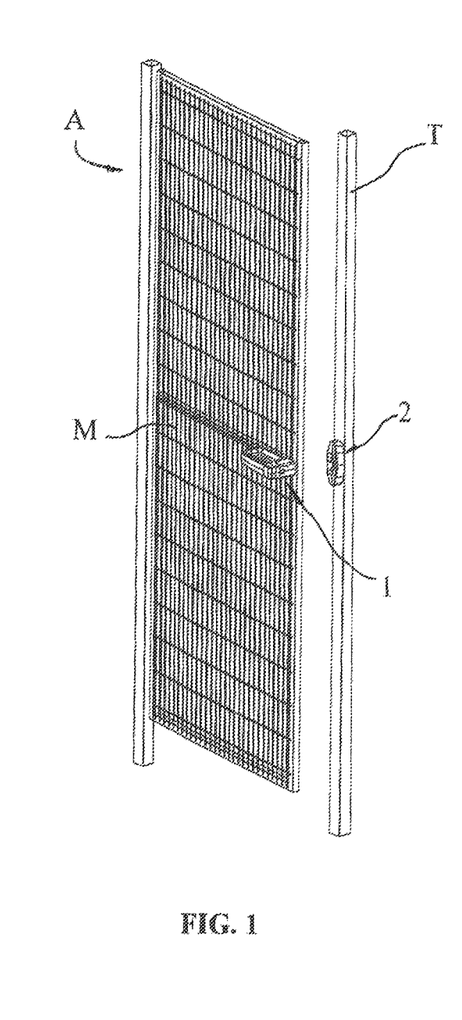
FIG. 1 is a perspective view of the assembly in a first embodiment and applied to a hinge opening access, wherein the access is open.
Figure 2:
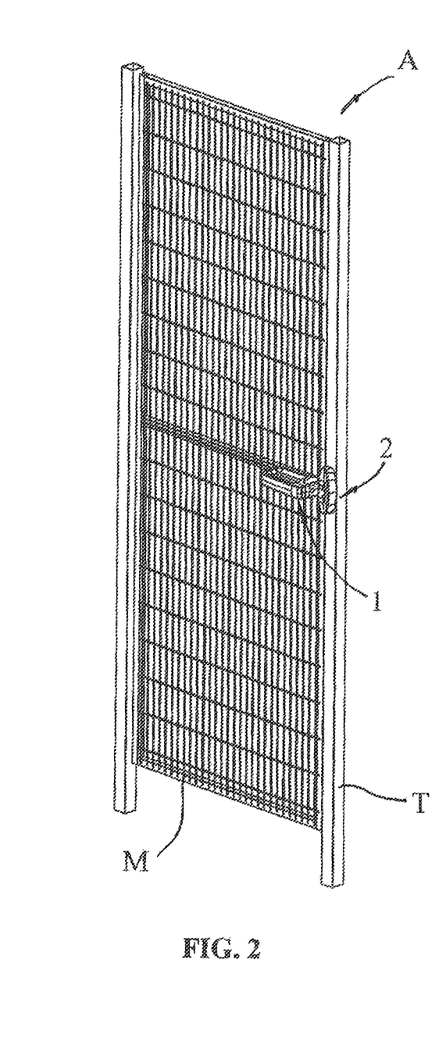
FIG. 2 is a perspective view of the assembly of FIG. 1, wherein the access is closed.

FIGS. 1 and 2 show a first configuration mode of the assembly formed by a movable actuator device 1 and a fixed receiving device 2, wherein this assembly is associated with an access A with hinged closure, illustrated respectively in the opening and closing conditions, and wherein the movable actuator device 1 is anchored in a horizontal position.

Figure 3:
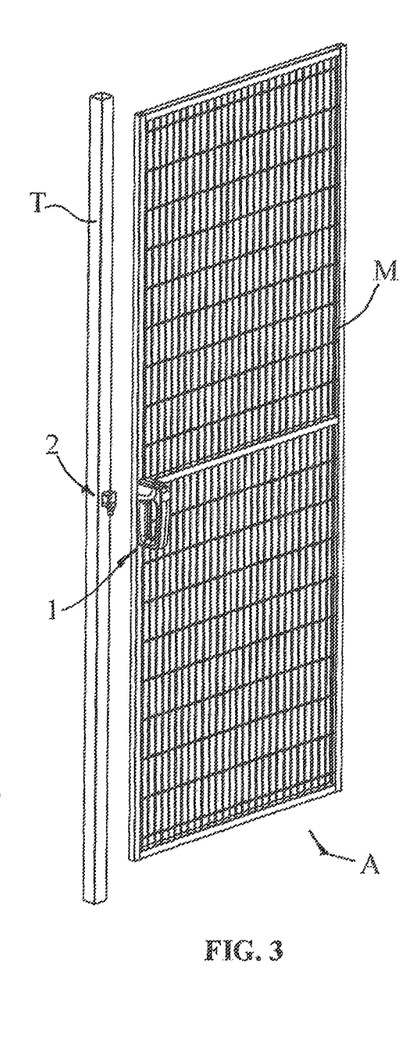
FIG. 3 is a perspective view of the assembly of FIG. 1 in a second assembly configuration and applied to an access with sliding opening, wherein the access is open.

FIG. 3 shows a different positioning of the actuator device 1, anchored to the movable part M of the access A in a vertical position.

Figure 4:
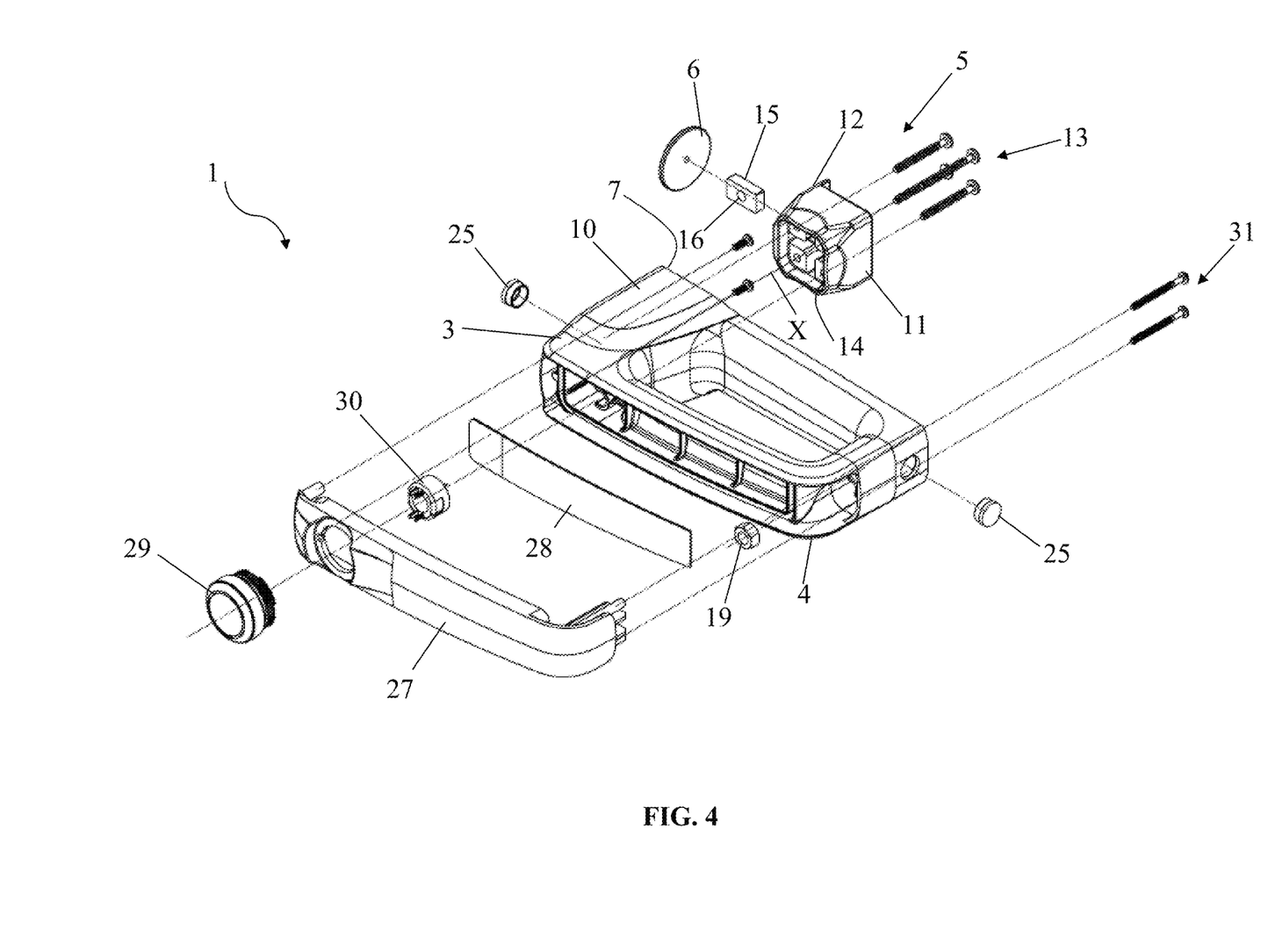
FIG. 4 is an exploded perspective view of the actuator device in a second embodiment.

On the other hand, FIG. 4 shows in greater detail a further embodiment of the handle actuator device 1 which in its more general configuration comprises a shell 3 provided with means for anchoring the access A to the movable part M and a handle portion 4 adapted to be grasped by a user for the movement of the movable part M of the access A.

The shell 3 is also associated with an actuator 5 provided with a first transmitting element 6 adapted to interact with the receiving device 2 upon the closing of the access A to enable/disable one or more operations of the machine or plant to be guarded.

In particular, the shell 3 is provided with a housing 7 shaped to accommodate the actuator 5 according to at least two different configurations for the orientation of the first transmitting element 6 and wherein this first element 6 is selectively facing two different faces 8, 9 of the housing 7.

Preferably, the actuator 5 will be inserted into the housing 7 according to three different orientations wherein the first transmitting element 6 is selectively facing three different faces 8, 9, 10 of the housing 7.

These configurations allow to adjust the position of the transmitting element 6 according to the horizontal or vertical anchoring orientation of the shell 3 and also to the position of the receiving device 2 on the fixed frame T, so as to make possible an interaction between the movable actuator device 1 and the fixed receiving device 2 both in the case in which the first moves, when access A is closed, from the left with respect to the second or from the right or from top to bottom or vice versa and whatever the orientation, horizontal or vertical, of the two devices defining the assembly.

Preferably but not exclusively, the first transmitting element 6 will be of the remotely operated type and will be provided with an RFID (Radio Frequency Identification) tag designed to communicate with a second receiving element, in particular an antenna, not shown, placed in the fixed receiving device 2 to signal that access A has been closed.

Advantageously, the RFID tag 6 will be coded so that it can be uniquely recognized by the receiving element and prevent the use of actuators other than the one connected to the actuator device 1, avoiding the risk of unsafe opening of the access A.

However, it is understood that the transmitting element 6 may also be of another type, for example with an electro-mechanical action, such as a key actuator, or by means of magnetic or electromagnetic, optical, or other type sensors and consequently the type of element receiver will adapt to the nature of the transmitting element.

In the same way, it will also be possible to provide variants wherein the actuator device 1 comprises a first element of the receiving type while the second element present on the fixed device 2 will be of the transmitting type.

As can be seen from the figures, the actuator 5 comprises a prismatic-shaped bearing block 11 suitable for being snugly fitted in the housing 7, to be completely contained in the shell 3 and be moved into one of the different orientations following its rotation around its central axis X.

The bearing block 11 comprises a seat 12 for anchoring the first transmitting element 6 adapted to be selectively brought into a position facing one of the faces 8, 9, 10 of the housing 7 following the rotation of the block 11 around its central axis X.

The first element 6 may be inserted in the seat 12 of the bearing block 11 in a fixed or removable manner.

Any stable positioning of the first transmitting element 6 in the seat 12 may be obtained by gluing, interlocking or by means of different mechanical fixing means.

Figure 5:
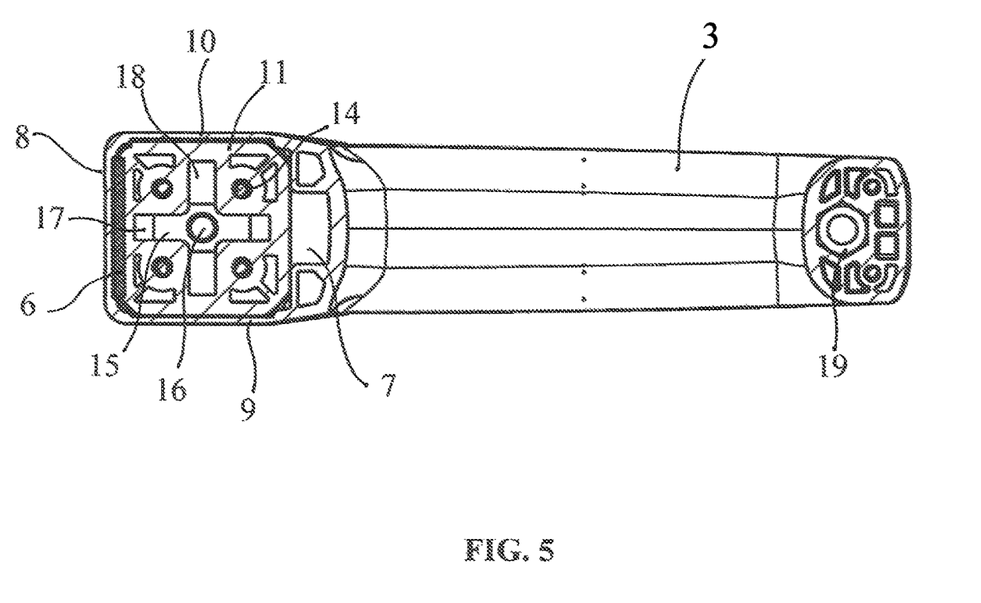
FIG. 5 is a front sectional view of the actuator device of FIG. 1 in a first operating configuration.

For example, from the section of FIG. 5, which shows a variant of the previous embodiment, it can be seen that the block 11 is arranged according to a first orientation such as to arrange the first transmitting element 6 in a position facing the external side face 8 of the housing 7.

Figure 6:
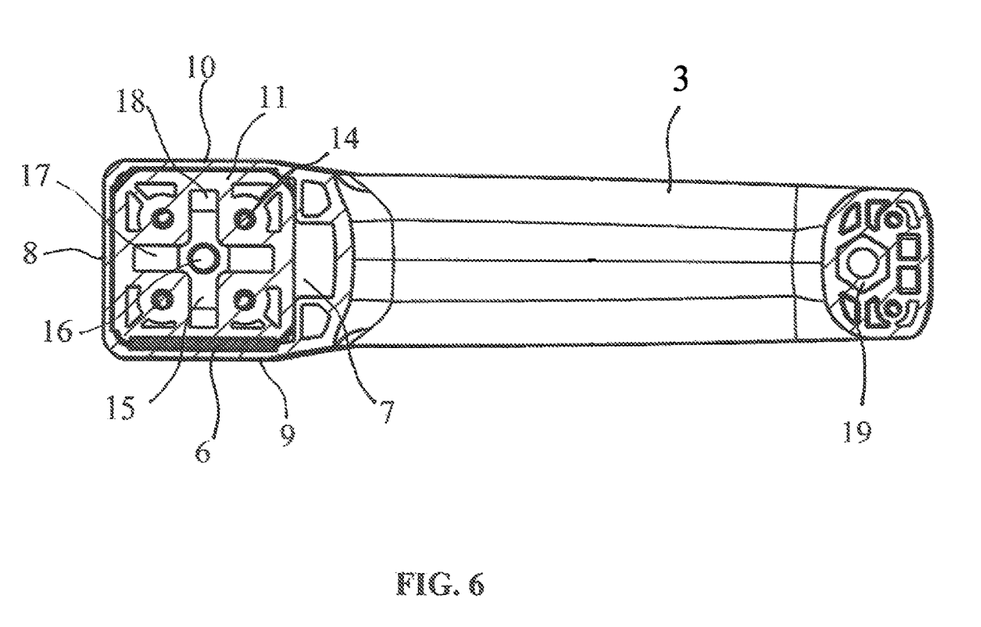
FIG. 6 is a front sectional view of the actuator device of FIG. 1 in a second operating configuration.

In FIG. 6 the block 11 is instead rotated by 90° with respect to the previous configuration to arrange the first transmitting element 6 in a position facing the lower face 9 of the housing 7.

Furthermore, a 90° rotation in the opposite direction with respect to the first configuration could have brought the first transmitting element 6 into a third position facing the upper face 10 of the housing 7.

According to a not shown variant, the block 11 may be provided with two or more seats wherein the first transmitting element 6 could be selectively positioned to change its orientation inside the housing 7 without having to rotate the block 11.

According to yet another not illustrated variant, the block 11 may be provided with two or more first elements 6 inserted, in a fixed or removable way, in corresponding seats of the block 11.

The conformations of the housing 7 and of the block 11 according to the figures are such that it is not possible to rotate the block 11 once inserted inside the housing 7, so that the orientation of the block 11 and, consequently, the position of the first transmitting element 6 must be defined before inserting the block 11 in the housing 7. However, it will be possible to provide a configuration such as to allow the adjustment of the orientation of the block 11 even once it has been inserted into the housing 7.

The stable fixing of the block 11 inside the housing 7 will be obtained by means of screw fixing means 13 or the like which will be inserted in proper axial passages 14 of the block 11 aligned with anchoring holes, not visible from the figures, present in the housing 7.

A variant which is not illustrated may provide that the actuator 5 is devoid of the block 11. In this case, the actuator may be defined only by the first element 6 of the transmitting or receiving type which can be inserted in suitable seats obtained directly inside the housing 7. Furthermore, it will be possible to provide two or more first elements 6 of the transmitting or receiving type which can be inserted simultaneously inside respective seats obtained in the housing 7 to selectively interact with the receiving device 2 according to the orientation assumed by the device actuator 1.

Regardless of the configuration of the actuator 5, the anchoring of the shell 3 may be obtained by screwing it directly onto the movable part M of the access A. This anchoring method will be particularly suitable for light shelters that do not require the application of excessive stress on the components upon the opening.

According to the first two variants described up to now, the fastening means comprise a plate 15 having an axial threaded hole 16 and adapted to be inserted in a proper axial slot 17 present in the block 11 to define a seat for screwing a first fixing screw.

Conveniently, the block 11 will comprise a pair of criss-crossing slots 17, 18 to selectively accommodate the perforated plate 15 whatever the orientation of the block 11 in the housing 7, as visible in the same FIGS. 5 and 6.

On the opposite side to the plate 15, the fixing of the shell 3 to the movable part M of the access A may be obtained by providing a threaded element, for example a nut 19, which will define a further seat for screwing a second fixing screw.

Figure 7:
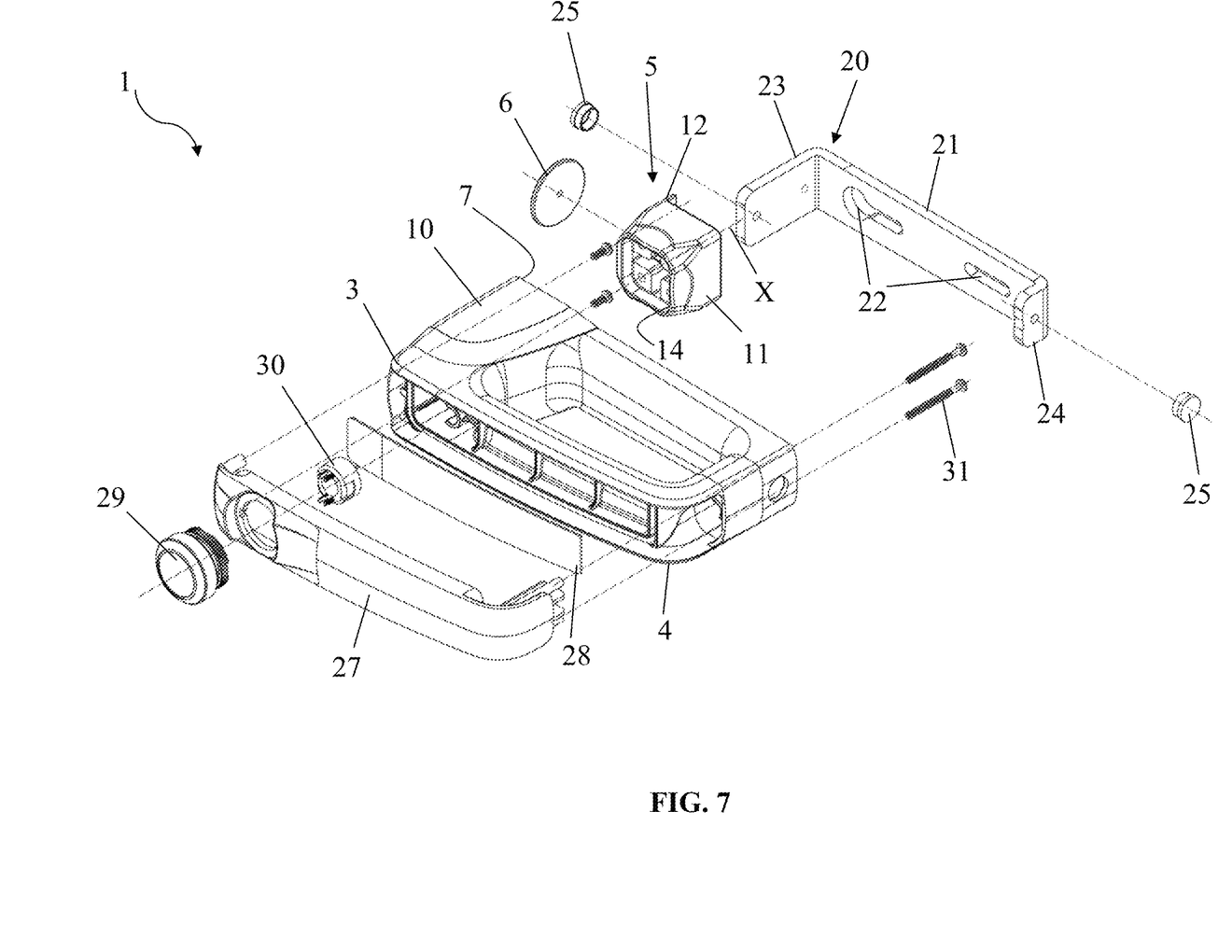
FIG. 7 is an exploded perspective view of the actuator device in a third embodiment.
Figure 8:
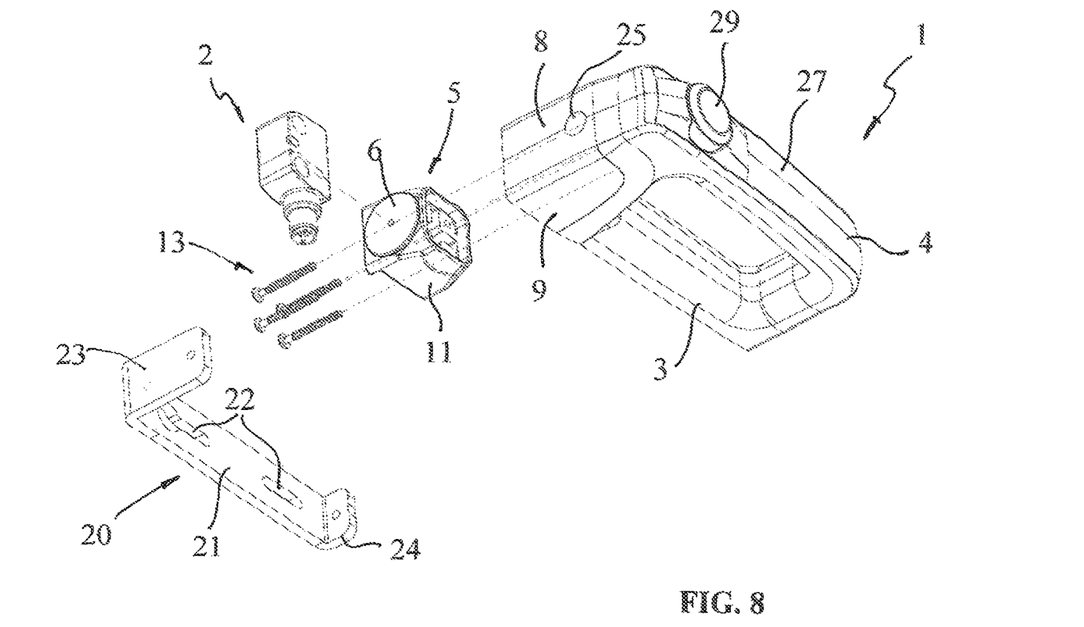
FIG. 8 is an exploded perspective view of the actuator device of FIG. 7 associated with a detector device according to a first operating configuration.
Figure 9:
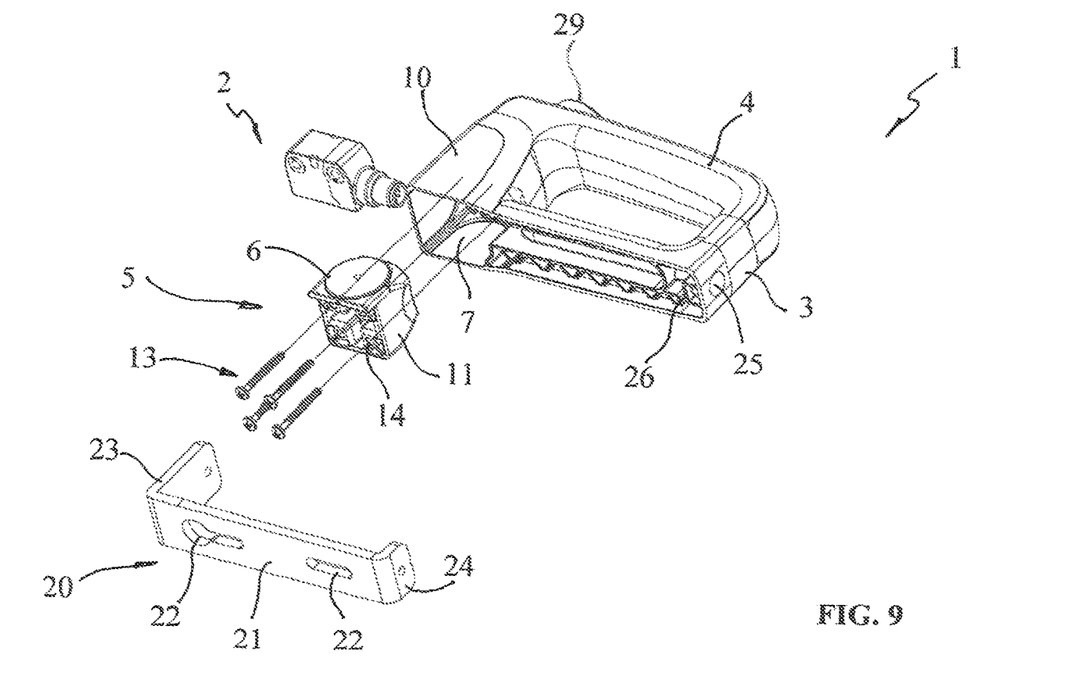
FIG. 9 is an exploded perspective view of the actuator device of FIG. 7 associated with the detector device in a second operating configuration.

In FIGS. from 7 to 9 a further variant is shown which provides that the anchoring means are also provided with a fixing bracket 20.

The bracket 20 has a central bar 21 provided with holes or slots 22 for the passage of screws or other mechanical fastening members and adapted to be anchored to the shell 3.

The bracket 20 has two transverse lateral arms 23, 24 folded in an L shape which instead will be fixed to the side walls of the shell 3 by means of further fastening members inserted through lateral passages of the shell itself.

These side passages can be advantageously closed by means of anti-tampering caps 25 designed to close the respective passages and prevent access from the outside to the fastening elements.

In this way, it will not be possible to remove the shell 3 from the bracket 20 without leaving a trace of such an action and therefore it will not be possible to access the fastening means of the bracket 20 without leaving a trace thereof.

Furthermore, it will be avoided that a situation of possible danger can be created in which the actuator 5 is separated from the access A but brought close to the receiving device 2 which, once the actuator 5 is recognized, would detect a condition of access A closed, even if the latter could be open.

One of the two arms, in particular the longer one 23, will also be inserted inside the block 11 so that the bracket 20 defines at least in part both the anchoring means of the shell 3 and the fastening means of the block 11.

In particular, also in this case the block 11 will have at least one axial slot 17 wherein the transverse arm 23 will fit.

Figure 10:
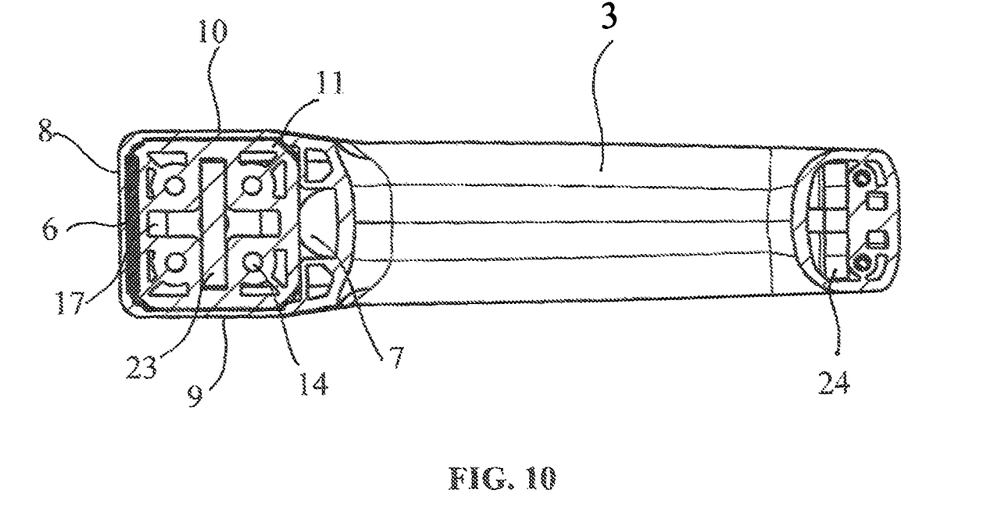
FIG. 10 is a front sectional view of a variant of the actuator device of FIG. 7 in a first operating configuration.
Figure 11:
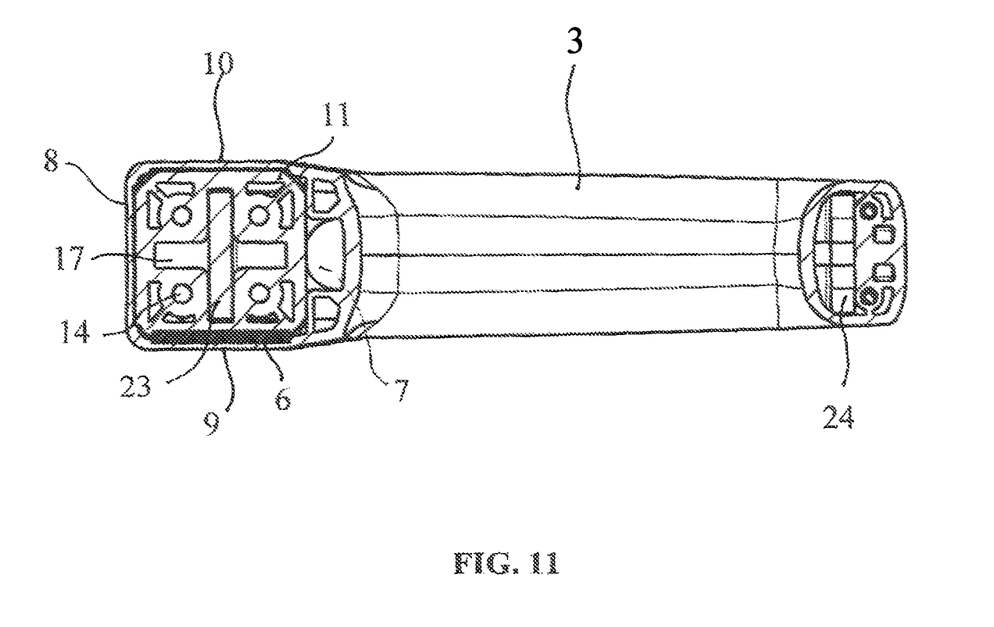
FIG. 11 is a front sectional view of the actuator device of FIG. 9 in a second operating configuration.

Conveniently, the block 11 will comprise a pair of criss-crossing slots 17, 18 to selectively house the arm 23 according to the orientation of the block 11 inside the housing 7, as visible in FIGS. 10 and 11.

The other transverse arm 24 of the bracket 20 may instead fit into a respective lateral slot 26 provided in the shell 3.

The handle actuator device 1 may be implemented with further functions, integrated for example inside the shell 3.

For example, the shell 3 may house thereinside or in any case be associated with one or more control and/or signalling devices auxiliary to the operation of the system which can be connected to a circuit of the machine or plant through the provision of suitable means for electrical and/or electronic connection.

By way of example, it can be observed that the front handle portion 4 of the shell 2 has a front mask 27, which can be fixed or removable.

The mask 27 may be used to customize the handle actuator device 1 according to the user's needs, for example by reporting specific writings or symbols or by varying the colour.

The mask 27 may be anchored to the front handle portion 4 in a removable or fixed manner.

In a particular variant, the handle portion 4 will be internally hollow to insert the above auxiliary control and/or signalling devices connected to a circuit of the machine or plant by means of electrical and/or electronic connection placed inside the shell 3, such as for example a printed circuit board (PCB) 28.

According to a particular variant, not illustrated, it will be possible to insert one or more light sources, such as one or more LED lights, for example placed directly on the PCB 28, which can light up in different ways that vary according to the state of the machine or plant, so as to give immediate evidence.

To this end, the mask 27 will be at least partially optically transparent or translucent to allow the passage of the light beam produced by the light sources.

According to yet another variant, the actuator device 1 will be provided with a command or signalling device 29 suitable for being connected to a power and/or service circuit of the machine or plant to be guarded.

The command or signalling device 29 may be an actuation button, as shown in the figure, provided with a second manual-type actuator adapted to interact with a contact unit 30 located inside the shell 3 and connected to the PCB 28, according to modality which depend on the type of command.

As an alternative to the activation button, different types of command or signalling devices may be provided, such as, but not limited to, a selector, a display, a touch panel, an RFID recognition sensor or any other electrical, electronic, electromechanical device suitable for give a command or send a signal to one or more power and/or service circuits of the machine or plant.

Further devices that may be associated or inserted in the shell 3 may be light and/or sound signalling devices or sensors or other receiving devices for the recognition of identification devices, such as a token with which an operator can request authorization to enter the security perimeter.

The fixing of the mask 27 to the shell 3 may be achieved by means of connection 31 of the screw type or the like, or snap or interference, without particular theoretical limitations.

Figure 12:
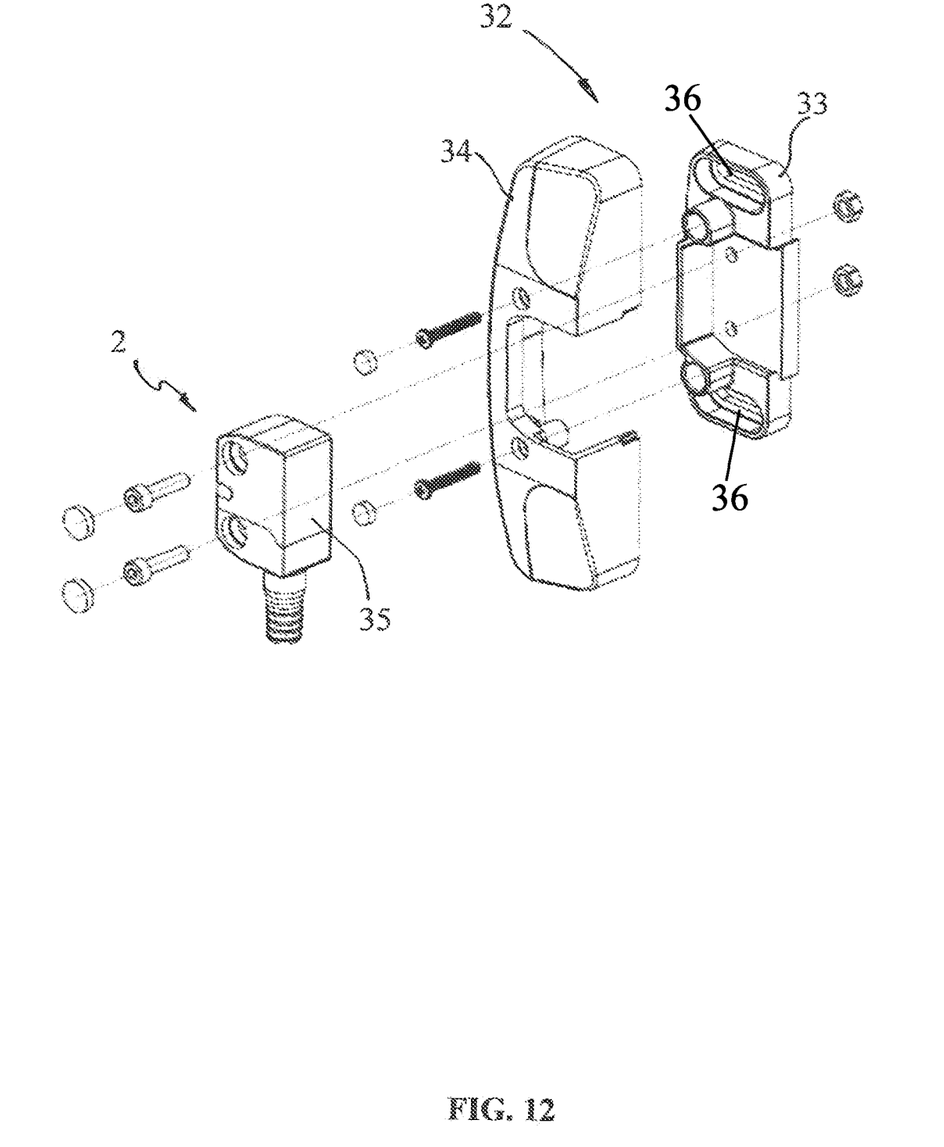
FIG. 12 is an exploded perspective view of the detector device according to a further embodiment.

Finally, FIG. 12 shows a particular embodiment of a position sensor, defining the fixed receiving device 2 and which will not necessarily be usable inside an assembly according to the present invention but will find its place in any further type of application which provides for the use of position or presence sensors.

In this configuration the sensor 2 is provided with a protective casing 32 having a fixing plate 33 wherein the sensor 2 will be inserted and fixed and which will be provided with fixing slots 36 suitable for allowing the adjustment of the position of the sensor 2.

An upper cover 34 will cover the plate 33 and the sensor 2, leaving free at least the lateral face 35 in correspondence with which the antenna or other receiving or even transmitting element is located, according to requirements, so as not to hinder communication with the RFID tag 6, and at the same time concealing from view and making it inaccessible and protecting the cable outlet of the sensor 2.

The solutions described above and illustrated in the figures will be particularly suitable for the realization of light-type handle actuator devices, that is, suitable for being applied to barriers or protection panels that do not also require mechanical access blocking.

In this case, the actuator 5 will have no retaining lock or other mechanisms adapted to engage or interacting mechanically with the fixed device 2 to keep the access A closed even following the application of an opening stress of predetermined maximum intensity.

It is understood that similar or technically equivalent solutions may also be used for handle actuator devices having a more robust structure and/or provided with locking means of the type described in the cited WO2019229717.

The invention claimed is:

1. A handle actuator device for barriers or protection panels for access to industrial machines or plants, wherein an access (A) comprises a movable part (M) and a fixed frame (T) which a fixed device (2) of the receiving or transmitting type connected to the machine or plant is fixed to, which handle actuator device (1) comprises:
   a shell (3) having means for anchoring to the movable part (M) of the access (A) and provided with a handle portion (4) adapted to be grasped by a user for moving the movable part (M) of the access (A);
   an actuator (5) associated with said shell (3) and provided with at least one first transmitting or receiving element (6) adapted to interact with the fixed receiving or transmitting device (2) placed on the fixed frame (T) of the access (A) at the closing thereof to enable/disable one or more operations of the machine or plant to be monitored;
   wherein said shell (3) comprises a housing (7) shaped to accommodate said actuator (5), completely contained thereinside, according to at least two configurations wherein said at least one first element (6) is oriented according to at least two different positions and is adapted to be facing selectively to at least two different faces (8, 9) of said housing (7).

2. The handle actuator device as claimed in claim 1, wherein said actuator (5) is adapted to be inserted in said housing (7) according to three different orientations wherein said first transmitting or receiving element (6) is adapted to be selectively facing three different faces (8, 9, 10) of said housing (7).

3. The handle actuator device as claimed in claim 2, wherein said actuator (5) comprises a prismatic-shaped bearing block (11) of suitable to be snugly fitted in said housing (7) to be brought in one of the different orientations following its rotation around its central axis (X).

4. The handle actuator device as claimed in claim 3, wherein said bearing block (11) has a seat (12) for anchoring said first transmitting or receiving element (6) and adapted to be selectively brought into a position facing one of said faces (8, 9, 10) of said housing (7) following the rotation of said block (11) around said central axis (X).

5. The handle actuator device as claimed in claim 1, wherein said housing (7) comprises two or more seats for the stable and/or removable insertion of a respective first element (6) of the transmitting or receiving type.

6. The handle actuator device as claimed in claim 1, further comprising means for fixing said actuator (5) in said housing (7).

7. The handle actuator device as claimed in claim 6, wherein said fixing means comprise a bracket (20) having a central bar (21) adapted to be anchored to a rear face of said shell (3) to define at least part of said anchoring means and having a transverse arm (23) adapted to be inserted into a corresponding axial slot (17, 18) of said block (11) for its stable fixing in said housing (7).

8. The handle actuator device as claimed in claim 7, wherein said block (11) comprises a pair of axial slots (17, 18) crossed with each other to selectively accommodate said transverse arm (23) according to the orientation of said block (11) in said housing (7).

9. The handle actuator device as claimed in claim 8, wherein said shell (3) houses or is associated with one or more control and/or signaling devices auxiliary to the operation of the system suitable for being connected to a circuit of the machine or plant, said devices being selected from light and sound signalling devices, recognition devices, said handle portion (4) being adapted to be provided with a front mask (27) at least partially luminous and housing one or more suitable light sources inside to emit signals or light beams visible through said mask (27).

10. An actuator assembly for barriers or protection panels for access to industrial machines or plants, wherein an access (A) comprises a movable part (M) and a fixed frame (T), which assembly comprises:
  an actuator device with a movable handle (1) having a shell (3) with means for anchoring to the movable part (M) of the access (A) and provided with a handle portion (4) adapted to be grasped by a user for moving the movable part (M) of the access (A), said shell (3) housing an actuator (5) provided with a first transmitting or receiving element (6);
  a fixed device (2) of the receiving or transmitting type adapted to be anchored to the fixed frame (T) of the access (A) and to be connected to the machine or plant, said fixed device (2) comprising a second receiving or transmitting element adapted to interact with said first transmitting or receiving element (6) upon closure of access (A) to enable/disable one or more operations of the machine or plant to be monitored;
  wherein said shell (3) has a housing (7) shaped to accommodate said actuator (5), completely contained thereinside, according to at least two configurations in which said first element (6) is oriented according to two different positions and faces two different faces (8, 9) of said housing (7).

11. The actuator assembly as claimed in claim 9, wherein the transmitting element between said first element (6) and said second element is a transmitting element of the remotely operated type, such as an RFID (Radio Frequency Identification) tag, to communicate with the other element of the receiving type, such as an antenna or similar.

12. The actuator assembly as claimed in claim 10, wherein said fixed device (2) is a receiving device selected from the group comprising the switches and position sensors and is provided with a second receiving element adapted to communicate remotely with said transmitting first element (6) of said actuator device (1).

13. A presence sensor, adapted to be used in actuator assemblies for barriers or protection panels for the access to industrial machines or plants of the type according to claim 10, which presence sensor comprises a receiving device (2) provided of a receiving element and a protective casing (32) having a lateral face (35) in correspondence with which the receiving element (6) is located and a fixing plate (33) having a housing for said receiving device (2) and a cover (34) designed to cover said plate (33) and said receiving device (2) leaving free at least one of the the lateral faces (35) in correspondence with which said receiving element is located.

14. The presence sensor as claimed in claim 13, wherein said receiving device (2) has at least one output for a connection cable or connector, said cover (34) being designed to cover said at least one output and prevent its access, exercising an anti-tampering function.

* * * * *